United States Patent
Kim et al.

(10) Patent No.: US 9,564,993 B2
(45) Date of Patent: Feb. 7, 2017

(54) METHOD AND APPARATUS FOR SOFT DEMAPPING IN ROTATED QUADRATURE AMPLITUDE MODULATION (QAM) BASED COMMUNICATION SYSTEM

(71) Applicant: Samsung Electronics Co., Ltd., Suwon-si (KR)

(72) Inventors: Kyeong Yeon Kim, Hwaseong-si (KR); Gyu Bum Kyung, Seoul (KR); Ki Taek Bae, Hwaseong-si (KR); Ho Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/507,049

(22) Filed: Oct. 6, 2014

(65) Prior Publication Data
US 2015/0172001 A1    Jun. 18, 2015

(30) Foreign Application Priority Data

Dec. 16, 2013   (KR) .......................... 10-2013-0156247

(51) Int. Cl.
*H04L 1/00* (2006.01)
*H04L 27/34* (2006.01)
*H04L 27/38* (2006.01)

(52) U.S. Cl.
CPC ........... *H04L 1/005* (2013.01); *H04L 27/3444* (2013.01); *H04L 27/38* (2013.01)

(58) Field of Classification Search
CPC . H04L 25/067; H04L 25/03171; H04L 1/0055
USPC . 375/259–262, 316, 320, 340–341; 714/746, 714/752, 755, 759, 780
See application file for complete search history.

(56) References Cited

U.S. PATENT DOCUMENTS

| | | | | |
|---|---|---|---|---|
| 2007/0260959 A1* | 11/2007 | Sidi | ...................... | H03M 13/256 714/755 |
| 2011/0051831 A1* | 3/2011 | Subrahmanya | ......... | H04L 1/005 375/262 |
| 2012/0288039 A1* | 11/2012 | Kim | .................... | H04L 27/3845 375/341 |
| 2014/0270012 A1* | 9/2014 | Sagi | ........................ | H04L 27/38 375/341 |

OTHER PUBLICATIONS

"Digital Video Broadcasting (DVB); Implementation guidelines for a second generation digital terrestrial television broadcasting system (DVB-T2)" DVB Document A133, DVB BlueBook A133, Jun. 2010 (213 pages).
Fan, YouZhe, et al. "Low-complexity rotated QAM demapper for the iterative receiver targeting DVB-T2 standard." Vehicular Technology Conference (VTC Fall), 2012 IEEE, IEEE, 2012 (5 pages).

* cited by examiner

*Primary Examiner* — Daniel Washburn
*Assistant Examiner* — Eboni Hughes
(74) *Attorney, Agent, or Firm* — NSIP Law (57) ABSTRACT

A method and apparatus to perform a soft demapping in a rotated quadrature amplitude modulation (QAM) based communication system is described. The method and the apparatus include pre-processing a symbol based on a priori information and performing a one-dimensional (1D) soft demapping on the pre-processed symbol, continuously.

22 Claims, 4 Drawing Sheets

METHOD AND APPARATUS FOR SOFT DEMAPPING IN ROTATED QUADRATURE AMPLITUDE MODULATION (QAM) BASED COMMUNICATION SYSTEM

CROSS-REFERENCE TO RELATED APPLICATION

This application claims the benefit under 35 USC 119(a) of Korean Patent Application No. 10-2013-0156247, filed on Dec. 16, 2013, in the Korean Intellectual Property Office, the entire disclosure of which is incorporated herein by reference for all purposes.

BACKGROUND

1. Field

The following description relates to a method and an apparatus configured to perform a soft demapping in a rotated quadrature amplitude modulation (QAM) based communication system.

2. Description of Related Art

A wireless communication system and a broadcasting system may use a rotated quadrature amplitude modulation (QAM) transmission technology. For example, a digital video broadcasting (DVB) standard, for example, a digital video broadcasting-second generation terrestrial (DVB-T2) standard, requires use of the rotated QAM.

During wireless signal reception and transmission, a wireless channel may experience fading in a wireless communication system. The fading refers to attenuation of a wireless signal during transmission of the wireless signal. To combat such fading-related issues, a diversity method may be employed. For example, the diversity method includes spatial diversity and frequency diversity.

Also, to prevent fading, a signal-space diversity method is used by a great number of technologies, including the DVB-T2 standard. As an example, a rotated QAM constellation may be used to implement the signal-space diversity method.

However, when a transmitter uses the rotated QAM, a receiver would be configured to be complex and would be required to perform a soft demapping. Accordingly, research is continuously conducted reduce structural and functional complexity required to perform the soft demapping at the receiver.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method to perform a soft demapping, the method including pre-processing a symbol based on a priori information; and performing a one-dimensional (1D) soft demapping on the pre-processed symbol.

The pre-processing and the soft demapping may be performed continuously.

The symbol may correspond to a rotated quadrature amplitude modulation (QAM) symbol.

The pre-processing includes dividing the symbol into an I channel symbol and a Q channel symbol based on the a priori information.

The dividing of the symbol into the I channel symbol and the Q channel symbol may include estimating the I channel symbol and the Q channel symbol based on a minimum mean square error (MMSE) method or a minimum mean square error-interference cancellation (MMSE-IC) method.

The soft demapping may include calculating a 1D log-likelihood ratio (LLR) with respect to the I channel symbol and a 1D LLR with respect to the Q channel symbol.

The calculating of the 1D LLR with respect to the I channel symbol and the 1D LLR with respect to the Q channel symbol may include calculating each of the 1D LLR with respect to the I channel symbol and the 1D LLR with respect to the Q channel symbol.

The calculating of the 1D LLR with respect to the I channel symbol and the calculating of the 1D LLR with respect to the Q channel symbol may include calculating the 1D LLR with respect to the I channel symbol and the 1D LLR with respect to the Q channel symbol based on the a priori information.

The a priori information may correspond to one of information about an LLR and information about an extrinsic LLR with respect to the symbol previously received from a channel decoder.

The method may also include remodulating the symbol by extracting a mean value and a variance value of the I channel symbol and the Q channel symbol.

The pre-processing may include estimating the I channel symbol based on the mean value and the variance value of the Q channel symbol, and estimating the Q channel symbol based on the mean value and the variance value of the I channel symbol.

In accordance with an embodiment, there is provided an apparatus to perform a soft demapping, the apparatus includes a pre-processing unit configured to pre-process the symbol based on a priori information; and a demapping unit configured to perform a one-dimensional (1D) soft demapping on the pre-processed symbol.

The pre-processing unit and the demapping unit may be configured to be operated continuously.

The symbol may correspond to a rotated quadrature amplitude modulation (QAM) symbol.

The pre-processing unit may include a channel divider configured to divide the symbol into an I channel symbol and a Q channel symbol based on the a priori information.

The channel divider may be configured to estimate the I channel symbol and the Q channel symbol based on a minimum mean square error (MMSE) method or a minimum mean square error-interference cancellation (MMSE-IC) method.

The demapping unit may include a 1D log-likelihood ratio (LLR) calculation unit configured to calculate a 1D LLR with respect to the I channel symbol and calculate a 1D LLR with respect to the Q channel symbol.

The LLR calculation unit may be configured to calculate the 1D LLR with respect to the I channel symbol and the 1D LLR with respect to the Q channel symbol.

The LLR calculation unit may be configured to calculate the 1D LLR with respect to the I channel symbol and the 1D LLR with respect to the Q channel symbol based on the a priori information.

The a priori information may correspond to one of information about an LLR and information about an extrinsic LLR with respect to the symbol previously received from a channel decoder.

The apparatus may also include a soft remodulation unit configured to remodulate the symbol, wherein the soft remodulation unit may include a symbol information extraction unit configured to extract a mean value and a variance value of the I channel symbol and the Q channel symbol.

The pre-processing unit may include an I channel symbol estimation unit configured to estimate the I channel symbol based on the mean value and the variance value of the Q channel symbol, and a Q channel symbol estimation unit configured to estimate the Q channel symbol based on the mean value and the variance value of the I channel symbol.

In accordance with an embodiment, there is provided a receiver, including a pre-processing unit configured to divide a symbol, based on information about a log-likelihood ratio (LLR) or information about an extrinsic LLR with respect to a symbol previously received, into an I channel symbol and a Q channel symbol; and a demapping unit configured to calculate a 1D log-likelihood ratio (LLR) with respect to the I channel symbol and a 1D LLR with respect to the Q channel symbol.

The demapping unit may be further configured to calculate the 1D LLR with respect to the I channel symbol using a mean value and a variance value of the of the I channel symbol, and the 1D LLR with respect to the Q channel symbol using a mean value and a variance value of the Q channel symbol.

The apparatus may also include a bit de-interleaver configured to interleave the 1D LLR with respect to the I channel symbol and the 1D LLR with respect to the Q channel symbol calculated in the demapping unit.

The pre-processing unit may include an I channel symbol estimation unit configured to estimate the I channel symbol based on the mean value and the variance value of the Q channel symbol, and a Q channel symbol estimation unit configured to estimate the Q channel symbol based on the mean value and the variance value of the I channel symbol.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
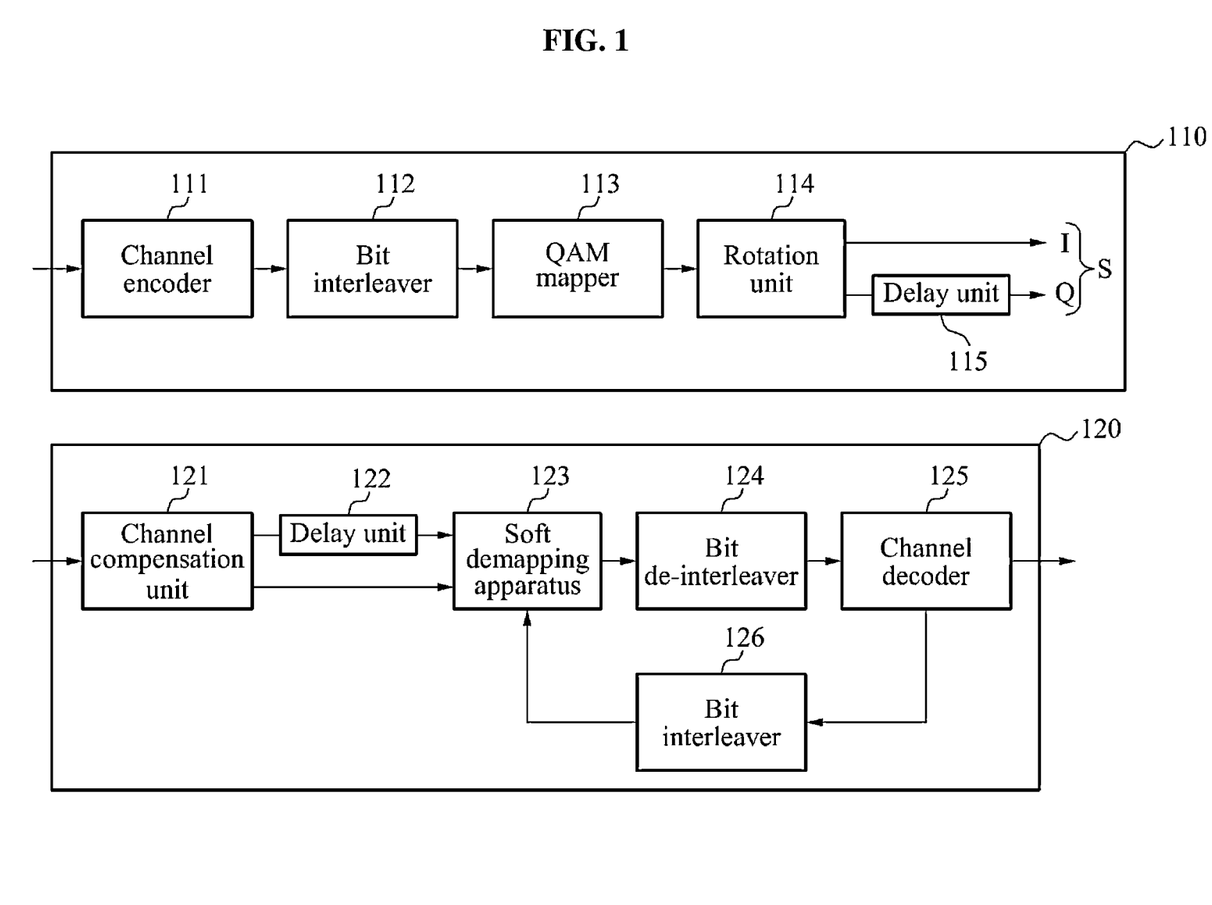
FIG. 1 is a diagram illustrating a rotated quadrature amplitude modulation (QAM) based communication system, in accord with an illustrative configuration.

FIG. 1 illustrates a rotated quadrature amplitude modulation (QAM) based communication system, in accord with an illustrative configuration.

Referring to FIG. 1, a transmitter 110 includes a channel encoder 111, a bit interleaver 112, a QAM mapper 113, a rotation unit 114, and a delay unit 115. A receiver 120 includes a channel compensation unit 121, a delay unit 122, an apparatus to perform a soft demapping, hereinafter also referred to as a soft demapping apparatus 123, a bit de-interleaver 124, a channel decoder 125, and a bit interleaver 126. In the transmitter 110, an input symbol is encoded in the channel encoder 111. The encoded input symbol passes through the bit interleaver 112, and is mapped to a QAM symbol in the QAM mapper 113. The QAM mapper 113 maps an input symbol in an "n" bit to an M-QAM symbol. In the following descriptions, unless otherwise indicated, a "QAM symbol" includes, for example, a QAM symbol, a 16-QAM symbol, a 32-QAM symbol, a 64-QAM symbol, and/or other types of M-QAM symbols. The M-QAM symbol is represented by a complex signal, $x = x_I + jx_Q$. The rotation unit 114 rotates the M-QAM symbol using a plurality of modulations, and generates a plurality of rotated M-QAM symbols to obtain signal space diversity (SSD). The delay unit 115 delays a Q channel from among the plurality of rotated M-QAM symbols, and obtains additional diversity. In one example, the delay unit 115 may be implemented as an I/Q interleaver, as done in a digital video broadcasting-next generation handheld (DVB-NGH) system. In one example, "I" is the "in-phase" component of a waveform of the interleaver, and "Q" represents a quadrature component. The rotated M-QAM symbol that passes through the delay unit 115 is represented by symbol s[n]. The transmitter 110 transmits the symbol s[n] to the receiver 120.

Instead of receiving the symbol s[n], the receiver 120 receives a faded symbol y[n] because the symbol s[n] may experience fading. The symbol y[n] is expressed by Equation 1.

$$y[n]=h[n]s[n]+w[n] \quad \text{[Equation 1]}$$

In Equation 1, h[n] denotes a Rayleigh channel coefficient, s[n] denotes the symbol transmitted from the transmitter 110, and w[n] denotes additional white Gaussian noise. In a "0" decibel (dB) echo channel or an erasure channel, the symbol y[n] is calculated by Equation 2.

$$y[n]=h[n]e[n]s[n]+w[n] \quad \text{[Equation 2]}$$

In Equation 2, e[n] denotes a random erasure channel. e[n] has an arbitrary value of "0" or "1". A probability of having the arbitrary value of "0" is defined by $P_e$.

The channel compensation unit 121 compensates for a channel phase with respect to the symbol y[n], and the delay unit 122 delays an I channel from among symbols compensated for a channel phase. A symbol received at the soft demapping apparatus 123 is represented by Equation 3.

$$\begin{bmatrix} r_I \\ r_Q \end{bmatrix} = \begin{bmatrix} \rho_I & 0 \\ 0 & \rho_Q \end{bmatrix} \begin{bmatrix} \cos\theta & \sin\theta \\ -\sin\theta & \cos\theta \end{bmatrix} \begin{bmatrix} x_I \\ x_Q \end{bmatrix} + \begin{bmatrix} w_I \\ w_Q \end{bmatrix} \quad \text{[Equation 3]}$$

In Equation 3, $r_I$ denotes an I channel component of the symbol received at the soft demapping apparatus 123, and denotes a $r_Q$ channel component. $P_I$ denotes a channel gain in an I channel, $P_Q$ and denotes a channel gain in a Q channel. $x_I$ denotes an I channel component in an M-QAM symbol that passes through the QAM mapper 113 in the transmitter 110, $x_Q$ and denotes a Q channel component in the M-QAM symbol that passes through the QAM mapper 113 in the transmitter 110. $w_I$ and $w_Q$ denote noise in an I channel and a Q channel, respectively. In one example, when $p_Q \triangleq \|h[n]e[n]\|$, $p_I \triangleq \|h[n-d]e[n-d]\|$.

The soft demapping apparatus 123 pre-processes the symbol received based on a priori information, and performs a one-dimensional (1D) soft demapping on the pre-processed symbol. In one example, the a priori information includes information about a log-likelihood ratio (LLR) or information about an extrinsic LLR with respect to a symbol previously or earlier received from a channel decoder 125. The soft demapping apparatus 123 calculates the LLR with respect to the pre-processed signal. Descriptions pertaining to the soft demapping apparatus 123 will be provided with reference to FIGS. 2 and 3.

The bit de-interleaver 124 de-interleaves the LLR generated at the soft demapping apparatus 123. The channel decoder 125 performs a decoding based on the LLR received in the bit de-interleaver 114 and estimates a symbol received at the transmitter 110. In one example, the channel decoder 125 continuously performs decoding. The bit interleaver 126 interleaves an output value from the channel decoder 125. In one example, the output value of the channel decoder 125 includes information about the LLR or information about an extrinsic LLR with respect to the symbol received at the soft demapping apparatus 123. The soft demapping apparatus 123 sets information received from the bit interleaver 126 to be the a priori information. In a similar manner to a preceding step, the soft demapping apparatus 123 pre-processes the symbol received at the soft demapping apparatus 123 based on the a priori information, and performs the 1D soft demapping on the pre-processed symbol. In one illustrative configuration, the performance of the receiver 120 is enhanced by continuously operating the soft demapping apparatus 123, the bit de-interleaver 124, the channel decoder 125, and the bit interleaver 126.

Figure 2:
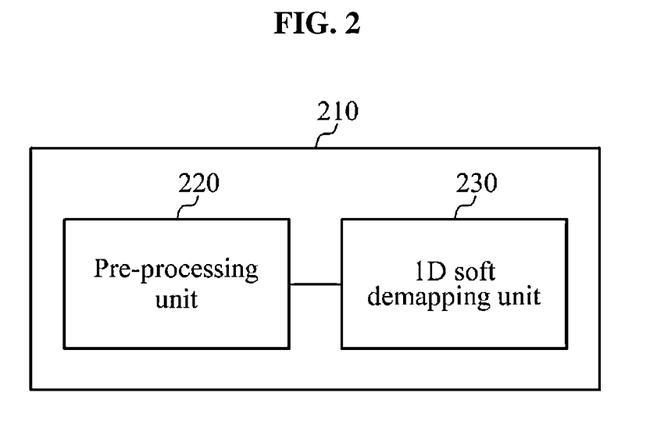
FIG. 2 is a block diagram illustrating a soft demapping apparatus, in accord with an illustrative configuration.

FIG. 2 illustrates a soft demapping apparatus 210, in accord with an illustrative configuration.

Referring to FIG. 2, the soft demapping apparatus 210 includes a pre-processing unit 220, a 1D soft demapping unit 230, and a controller (not shown).

A reception unit (not shown) receives a symbol from a transmitter (for example, the transmitter 110 of FIG. 1), and the pre-processing unit 220 obtains the symbol from a receiver (for example, the receiver 120 of FIG. 1). As used herein, the symbol refers to a rotated QAM symbol. The receiver compensates for a channel phase with respect to the symbol received from the transmitter, and delays an I channel in the symbol compensated for the channel phase. In response to the transmitter I/Q interleaving a symbol, and the transmitter transmitting the symbol to the reception unit, the reception unit performs a de-interleaving, subsequent to a channel compensation.

The pre-processing unit 220 divides the symbol into an I channel symbol and a Q channel symbol based on the a priori information. As stated before, the a priori information includes information about the LLR or information about an extrinsic LLR with respect to a symbol received from a channel decoder (for example, the channel decoder 125 of FIG. 1) in a preceding operation. In one example, the a priori information includes an output value of the channel decoder. The a priori information may have differing values for a plurality of operations. For example, the pre-processing unit 220 divides a symbol into the I channel symbol and the Q channel symbol without using the a priori information in an initial operation, and from a subsequent operation onward, divides the symbol into the I channel symbol and the Q channel symbol based on the a priori information.

The pre-processing unit 220 estimates the I channel symbol and the Q channel symbol based on a minimum mean square error (MMSE) method or a minimum mean square error-interference cancellation (MMSE-IC) method. Descriptions pertaining to the pre-processing based on the MMSE method will be provided with reference to FIG. 3.

The 1D soft demapping unit 230 calculates a 1D LLR with respect to the I channel symbol and a 1D LLR with respect to the Q channel symbol. The 1D soft demapping unit 230 calculates, per operation, each of the 1D LLR with respect to the I channel symbol and the 1D LLR with respect to the Q channel symbol. In one example, the 1D soft demapping unit 230 calculates the 1D LLR with respect to the I channel symbol using a mean value and a variance value of the I channel symbol. The 1D soft demapping unit 230 also calculates the 1D LLR with respect to the Q channel symbol using a mean value and a variance value of the Q channel symbol.

In response to the pre-processing unit 220 dividing the symbol into the I channel symbol and the Q channel symbol based on the a priori information, the 1D soft demapping unit 230 calculates the 1D LLR for a plurality of channels. Accordingly, an overall amount of operation may be reduced using the soft demapping apparatus 210, in accord with an embodiment. The 1D LLR, with respect to the I channel symbol, and the 1D LLR, with respect to the Q channel symbol, are input values of the channel decoder (for example, the channel decoder 125 of FIG. 1). The channel decoder performs a decoding based on the 1D LLR, with respect to the I channel symbol, and the 1D LLR, with respect to the Q channel symbol, received from the 1D soft demapping unit 230. The channel decoder also estimates the symbol received by the transmitter (for example, the transmitter 110 of FIG. 1). For example, the channel decoder continuously performs the decoding.

The pre-processing unit 220 receives the a priori information from the channel decoder, and pre-processes the symbol received from the reception unit (for example, the receiver 120 of FIG. 1) based on the a priori information. In one example, the soft demapping apparatus 210 includes a soft remodulation unit (not shown). The soft remodulation unit remodulates the symbol received from the reception unit. The soft remodulation unit extracts a mean value and a variance value for each of the I channel symbol and the Q channel symbol. The pre-processing unit 220 estimates the I channel symbol based on the mean value and the variance value of the Q channel symbol received from the soft remodulation unit. The pre-processing unit 220 estimates the Q channel symbol based on the mean value and the variance value of the I channel symbol received from the soft remodulation unit. In one illustrative example, a performance of the receiver may be enhanced by continuously operating the pre-processing unit 220 and the 1D soft demapping unit 230 because interference of the symbol received at the receiver is reduced.

The pre-processing unit 220 and the 1D soft demapping unit 230 are configured to continuously perform the pre-processing and the soft demapping. In one example, the pre-processing unit 220 and the 1D soft demapping unit 230 each may integrally include a controller to continuously perform the pre-processing and the soft demapping. In another example, a controller may be external to the pre-processing unit 220 and the 1D soft demapping unit 230, but internal to the soft demapping apparatus 210. For either example, the controller controls the pre-processing unit 220 and the 1D soft demapping unit 230 to operate continuously for a predetermined number of times. Alternatively, for either example, the controller sets a number of times for which the pre-processing unit 220 and the 1D soft demapping unit 230 perform iterative operations using an extrinsic information transfer (EXIT) chart.

The EXIT chart refers to a method used in performance analysis of channel decoding that requires a continuous decoding as in a low-density parity-check code (LDPC) or a turbo decoder and code design. The EXIT chart also indicates information about a performance of a system based on input information and output information of the system. For example, based on the EXIT chart, the controller sets a number of times for which a detection line indicating information, about a maximum a posteriori (MAP) detection performed at the soft demapping apparatus 210, intersects a decoding line, which indicates information about a decoding performed at the channel decoder (for example the channel decoder 125 of FIG. 1) to be the number of times for which the pre-processing unit 220 and the 1D soft demapping unit 230 perform iterative operations. The controller determines the number of times for which the pre-processing unit 220 and the 1D soft demapping unit 230 perform iterative operations based on a predetermined number of operations or a bit error probability.

Figure 3:
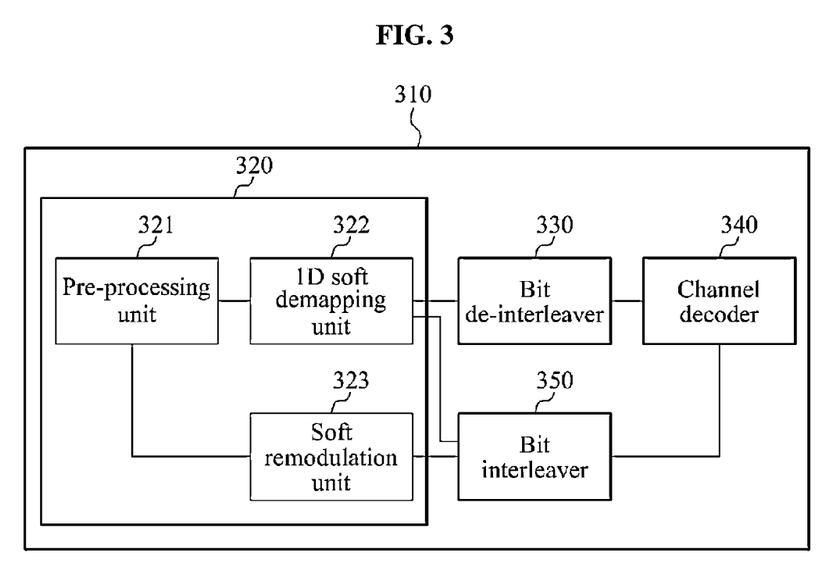
FIG. 3 is a diagram illustrating a soft demapping apparatus, in accord with an illustrative configuration.

FIG. 3 illustrates a soft demapping apparatus, in accordance with an illustrative configuration.

Referring to FIG. 3, a receiver 310 includes a soft demapping apparatus 320, a bit de-interleaver 330, a channel decoder 340, and a bit interleaver 350. The soft demapping apparatus 320 includes a pre-processing unit 321, a 1D soft demapping unit 322, and a soft remodulation unit 323. The preprocessing unit 321 receives a rotated QAM symbol sent from a transmitter over multipath fading channel with additive white Gaussian noise. (for example, the transmitter 110 of FIG. 1).

In an initial operation, the pre-processing unit 321 divides a received symbol into an I channel symbol and a Q channel symbol. The pre-processing unit 321 estimates the I channel symbol and the Q channel symbol based on an MMSE method or an MMSE-IC method. The 1D soft demapping unit 322 calculates a 1D LLR with respect to the I channel symbol, and a 1D LLR with respect to the Q channel symbol. The 1D soft demapping unit 322 calculates the 1D LLR with respect to the I channel symbol using a mean value and a variance value of the I channel symbol. The 1D soft demapping unit calculates the 1D LLR with respect to the Q channel symbol using a mean value and a variance value of the Q channel symbol.

The bit de-interleaver 330 de-interleaves the 1D LLR with respect to the I channel symbol and the 1D LLR with respect to the Q channel symbol, which are calculated in the 1D soft demapping unit 322. The channel decoder 340 estimates a symbol received from the transmitter by performing a decoding based on the LLRs received at the bit de-interleaver 330. The bit interleaver 350 interleaves an output value received from the channel decoder 340. The output value includes information about an LLR or information about an extrinsic LLR of the symbol received by the soft demapping apparatus 123. The soft remodulation unit 323 extracts the mean value and the variance value of each of the I channel symbol and the Q channel symbol.

In a subsequent operation, the pre-processing unit 321 divides the symbol received based on a priori information. The pre-processing unit 321 also divides the mean value and the variance value for each of the I channel symbol and the Q channel symbol, which are extracted from the soft remodulation unit 323, into the I channel symbol and the Q channel symbol. An interference component of the divided I channel symbol and the Q channel symbol is reduced to be less than the I channel symbol and the Q channel symbol divided in the preceding operation. In one example, the pre-processing unit 321 divides the received symbol into the I channel symbol and the Q channel symbol by applying the MMSE method to the received symbol based on Equation 4.

$$\min_{\hat{x}_I} E[(\hat{x}-x)^2 \mid H, \mu_Q, \sigma_Q] \quad \text{[Equation 4]}$$

$$\min_{\hat{x}_Q} E[(\hat{x}-x)^2 \mid H, \mu_I, \sigma_I]$$

In Equation 4, $\hat{x}_I$ denotes an estimated I channel symbol, $\hat{x}_Q$ denotes an estimated Q channel symbol. $\mu_I$, $\sigma_I$ each denote the mean value and the variance value of an I channel extracted from the soft remodulation unit 323. $\mu_Q$, $\sigma_Q$ each denote the mean value and the variance value of a Q channel extracted from the soft remodulation unit 323. H denotes $$\begin{bmatrix} \rho I & 0 \\ 0 & \rho Q \end{bmatrix} \begin{bmatrix} \cos\theta & \sin\theta \\ -\sin\theta & \cos\theta \end{bmatrix}$$

in Equation 3. In the MMSE method, the I channel symbol is estimated based on the mean value and the variance value of the Q channel symbol. Further, the Q channel symbol is estimated based on the mean value and the variance value of the I channel symbol, hence a reduced amount of operation in the pre-processing unit 321.

When the MMSE method is applied, the pre-processed symbol is represented by Equation 5.

$$\hat{x}_{MMSE} \triangleq \left(H^T V H + \frac{\sigma^2}{2}I\right)^{-1} H^T(r - H\bar{x}) \quad \text{[Equation 5]}$$

$$= \left(H^T V H + \frac{\sigma^2}{2}I\right)^{-1} H^T H(x - \bar{x}) +$$

$$\left(H^T V H + \frac{\sigma^2}{2}I\right)^{-1} H^T w$$

In Equation 5, V and x̂ each denote a variance matrix and a mean vector calculated based on the a priori information from the channel decoder 340.

$$\frac{\sigma^2}{2}I$$

denotes a covariance matrix of addition noise present in each of an I channel and a Q channel, and I denotes an identity matrix. When a transmission power of a QAM signal is "1", variance of complex Gaussian noise is $\sigma^2$. When the variance of the complex Gaussian noise is applied to each of the I channel and the Q channel, the variance of the complex Gaussian noise may change to $$\frac{\sigma^2}{2}$$

for each of the I channel and the Q channel. V denotes a diagonal matrix including $[v_I, v_Q]$ as a diagonal component, $\overline{X}$ and denotes a vector including $[\overline{x}_I, \overline{x}_Q]$. W denotes additional white Gaussian noise. When the I channel symbol is estimated based on the MMSE method, $v_I$ corresponds to "½", and $\overline{x}_I$ corresponds to "0". When the Q channel symbol is estimated based on the MMSE method, $v_Q$ corresponds to "½", and $\overline{x}_Q$ corresponds to "0". A covariance matrix configuring an MMSE filter is defined by Equation 6.

$$(H^T V H + \sigma^2/2 I)^{-1} = \quad \text{[Equation 6]}$$

$$Q^T \begin{bmatrix} 1/\left(v_I \rho_I^2 + \frac{\sigma^2}{2}\right) & 0 \\ 0 & 1/\left(v_Q \rho_Q^2 + \frac{\sigma^2}{2}\right) \end{bmatrix} Q$$

In Equation 6, $p_I$ and $p_Q$ each denote a signal gain of the I channel and a signal gain of the Q channel. Based on Equation 6, $(H^T V H + \sigma^2/2 I)^{-1}$ is given by $$Q^T \begin{bmatrix} 1/\left(v_I \rho_I^2 + \frac{\sigma^2}{2}\right) & 0 \\ 0 & 1/\left(v_Q \rho_Q^2 + \frac{\sigma^2}{2}\right) \end{bmatrix} Q.$$

As a result of the above, a number of operations is reduced in the receiver 310 due to an omission of unnecessary calculations of an inverse-matrix.

In one example, a received signal of an MMSE iterative receiver of an I channel is derived from Equation 7.

$$\hat{x}_{MMSE,I} = \left(\frac{2\rho_I^2}{\rho_I^2 + \sigma^2}\cos^2\theta + \frac{2\rho_Q^2}{v_Q\rho_Q^2 + \sigma^2}\sin^2\theta\right)x_I - \quad \text{[Equation 7]}$$

$$\left(\frac{2\rho_I^2}{\rho_I^2 + \sigma^2} - \frac{2\rho_Q^2}{v_Q\rho_Q^2 + \sigma^2}\right)\cos\theta\sin\theta(x_Q - \ddot{x}_Q) +$$

$$\frac{2\rho_I}{\rho_I^2 + \sigma^2}\cos\theta w_I + \frac{2\rho_Q}{v_Q\rho_Q^2 + \sigma^2}\sin\theta w_Q$$

The soft demapping apparatus 320 configures $x_Q$ and $v_Q$ in response to receiving the a priori information from the channel decoder 340. Continuously performing a signal detection and a decoding enhances an overall performance of the receiver 310 because interference is reduced in response to being $\overline{x}_Q$ close to a real value. In the iterative receiver, $v_I$ and $v_Q$ are both "½", and in response to the signal detection and the decoding continuously performed, $v_Q$ has a value close to "0" in I channel processing, and $v_I$ has a value close to "0" in Q channel processing. The a priori information may use the extrinsic LLR or the entire LLR from the channel decoder 340.

In one example, the receiver 310 is extensively applied to a multi-dimensional rotated QAM. A channel matrix includes a power matrix in a diagonal matrix and a unitary matrix. For example, a four-dimensional (4D) rotated QAM may be used in a DVB-NGH system, and a rotated QAM signal is calculated by Equation 8.

$$\begin{bmatrix} y_0 \\ y_1 \\ y_2 \\ y_3 \end{bmatrix} = \begin{bmatrix} +a & -b & -b & -b \\ +b & +a & -b & +b \\ +b & +b & +a & -b \\ +b & -b & +b & +a \end{bmatrix}\begin{bmatrix} x_0 \\ x_1 \\ x_2 \\ x_3 \end{bmatrix} \quad \text{[Equation 8]}$$

Each row norm of a rotation matrix is "1" in order to remove a power increase by rotation. For example, $a^2+(N_D-1)b^2=1 \Rightarrow a=\sqrt{1-(N_D-1)b^2}$, where $(N_D=4)$. An input vector symbol "X" includes a real number portion and an imaginary number portion obtained from two adjacent cells corresponding to a subcarrier. An interleaving of a vector "y" may be required subsequent to a rotation of a QAM signal. In a case of the DVB-NGH system, an interleaving of a signal vector may be performed subsequent to rotation because the DVB-NGH system includes an I/Q interleaving and a cell interleaving.

Compared to a conventional iterative receiver having an unlimited noise level, the receiver 310 has a predetermined level of noise in an erasure channel in which $p_I=0$ or $p_Q=0$. When $p_I=0$ in an initial loop, a pre-processed symbol may be represented by Equation 9.

$$\hat{x}_{MMSE} = 2\begin{bmatrix} \frac{\rho_Q^2}{\rho_Q^2+\sigma^2}\sin^2\theta x_I + \frac{\rho_Q^2}{\rho_Q^2+\sigma^2}\cos\theta\sin\theta x_Q + \frac{\rho_Q}{\rho_Q^2+\sigma^2}\sin\theta w_Q \\ \frac{\rho_Q^2}{\rho_Q^2+\sigma^2}\cos\theta\sin\theta x_I + \frac{\rho_Q^2}{\rho_Q^2+\sigma^2}\cos^2\theta x_Q + \frac{\rho_Q}{\rho_Q^2+\sigma^2}\cos\theta w_Q \end{bmatrix} \quad \text{[Equation 9]}$$

In Equation 9, $$\frac{\rho_Q}{\rho_Q^2+\sigma^2}\sin\theta w_Q \text{ and } \frac{\rho_Q}{\rho_Q^2+\sigma^2}\cos\theta w_Q$$

denote a noise component.

$$\frac{\rho_Q}{\rho_Q^2+\sigma^2}\sin\theta w_Q \text{ and } \frac{\rho_Q}{\rho_Q^2+\sigma^2}\cos\theta w_Q$$

are subject to $P_Q$, and have a limited value. Accordingly, error flowing may not occur in the pre-processed symbol.

The 1D soft demapping unit 322 calculates a signal vector, subsequent to being pre-processed, assuming a vector Gaussian. In the alternative, the 1D soft demapping unit 322 calculates the signal vector, subsequent to being pre-processed, for each of an I channel and a Q channel, assuming a scalar Gaussian. For example, when the scalar Gaussian assumption is made independently for each of the I channel and the Q channel, the vector signal subsequent to being pre-processed is represented by Equations 10 and 11.

$$A_{ext}(b_{k,i}) \approx \qquad \text{[Equation 10]}$$

$$\log\left(\frac{\sum\limits_{x_i:a_i\in A_{k,i}^0} Pr(\hat{x}_i\mid a_i)\prod\limits_{j=0,j\neq k}^{K/2}\exp(-b_{j,i}\Lambda_{pri}(b_{j,i}))}{\sum\limits_{x_i:a_i\in A_{k,i}^1} Pr(\hat{x}_i\mid a_i)\prod\limits_{j=0,j\neq k}^{K/2}\exp(-b_{j,i}\Lambda_{pri}(b_{j,i}))}\right)$$

When signals of the I channel and the Q channel subsequent to being pre-processed are independent from one another, the 1D soft demapping unit 322 independently calculates an LLR with respect to an "i"-th signal for each of the I channel and the Q channel as shown in Equation 10. In Equation 10, "i" denotes an I channel or a Q channel. $\hat{x}_i$ denotes an "i"-th MMSE received signal. From an aspect of a director, $\Lambda_{ext}$ and $\Lambda_{pri}$ each denote an extrinsic LLR and an a priori LLR. $\Lambda_{pri}$ denotes a value that is obtained through an output of a decoder being interleaved in a previous loop. $A_{k,i}^1$ and $A_{k,i}^0$ denote a group of pulse-amplitude modulation (PAM) signals of which a $b_{k,i}$ bit is "1" or "0". An "i"-th PAM signal $a_i$ includes a "K/2" number of bits, in which bits are defined by $b_i \triangleq [b_{0,i}, b_{0,i}, \ldots, b_{K/2-1,i}]$. Pr(A|B) denotes a probability of A when B is given. When a Gaussian assumption is made with respect to the interference and the noise component in Equation 10, an LLR is represented by Equation 11.

[Equation 11]

$$\log\left(\frac{\sum\limits_{x_i:a_i\in A_{k,i}^0}\exp\left(-\beta_i\|\hat{x}_i-\gamma_i a_i\|^2 - \sum\limits_{j=0,j\neq k}^{K/2} b_{j,i}\Lambda_{pri}(b_{j,i})\right)}{\sum\limits_{x_i:a_i\in A_{k,i}^1}\exp\left(-\beta_i\|\hat{x}_i-\gamma_i a_i\|^2 - \sum\limits_{j=0,j\neq k}^{K/2} b_{j,i}\Lambda_{pri}(b_{j,i})\right)}\right)$$

In Equation 11, $\gamma_i$ and $\beta_i$ each denote a received channel gain subsequent to being MMSE pre-processed and a received signal to interference plus noise ratio (SINR). Equation 11 is expressed in various manners based on an approximation method, and when a maximum log sum is approximated, Equation 11 is represented by Equation 12.

$$\min_{x_i:a_i\in A_{k,i}^0}\left(\beta_i\|\hat{x}_i-\gamma_i a_i\|^2 + \sum_{j=0,j\neq k}^{K/2} b_{j,i}\Lambda_{pri}(b_{j,i})\right) - \qquad \text{[Equation 12]}$$

$$\min_{x_i:a_i\in A_{k,i}^1}\left(\beta_i\|\hat{x}_i-\gamma_i a_i\|^2 + \sum_{j=0,j\neq k}^{K/2} b_{j,i}\Lambda_{pri}(b_{j,i})\right)$$

Based on Equation 12, the 1D soft demapping unit 322 is configured using a table, which includes information about partial linearization subsequent to being pre-processed because available a priori information is absent in an initial operation. In a subsequent operation, similar to the initial operation, the 1D soft demapping unit 322 calculates a 1D LLR with respect to the I channel and a 1D LLR with respect to the Q channel using Equation 11 and Equation 12, respectively, based on the pre-processed symbol. The channel decoder 340 estimates a symbol received from the transmitter by performing a decoding based on bit de-interleaved LLRs. The soft remodulation unit 323 extracts a mean value and a variance value for each of the I channel symbol and the Q channel symbol.

The soft demapping apparatus 320 continuously operates the pre-processing unit 321, the 1D soft demapping unit 322, and the soft remodulation unit 323 for a number of times predetermined by the controller.

Figure 4:
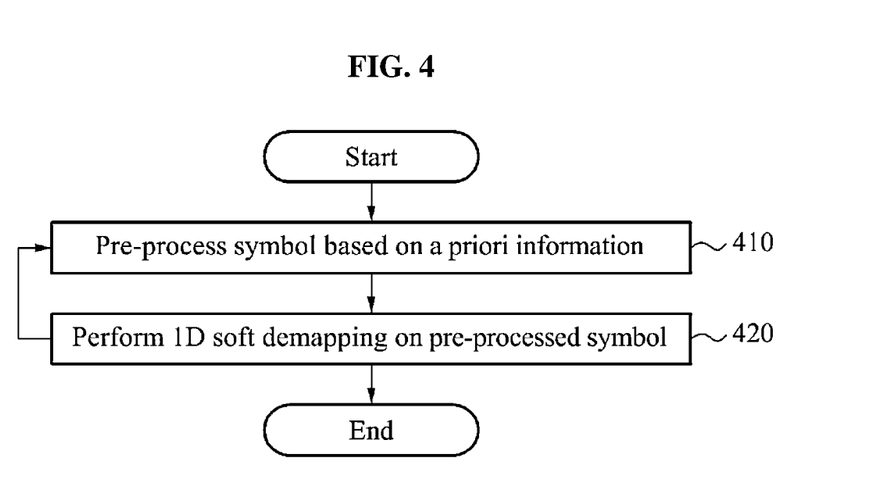
FIG. 4 is a flowchart illustrating a soft demapping method, in accord with an illustrative configuration.

FIG. 4 illustrates a soft demapping method, in accordance with an illustrative configuration.

Referring to FIG. 4, at operation 410, the soft demapping method includes pre-processing a symbol based on a priori information.

At operation 420, the soft demapping method includes performing a 1D soft demapping on the pre-processed symbol. The soft demapping method may continuously perform the pre-processing and the soft demapping.

Descriptions of FIGS. 1 through 3 provided in the preceding may be applied to the soft demapping method described in FIG. 4 and; thus, repeated descriptions will be omitted for conciseness.

The units described herein may be implemented using structural, hardware components. For example, the hardware components may include controllers, transmitters, receiver, compensators, rotators, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

It is to be understood that in an embodiment, the operations in FIG. 4 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIG. 4.

Program instructions to perform a method described in FIG. 4, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method to perform a soft demapping, the method comprising:
   pre-processing a symbol, based on a priori information, wherein the preprocessing comprises:
   pre-processing an I channel symbol of the symbol, based on statistics of a Q channel symbol of a previously estimated symbol, and
   pre-processing a Q channel symbol of the symbol, based on statistics of an I channel symbol of the previously estimated symbol;
   wherein the statistics of the Q channel symbol comprise a mean value and a variance value; and
   wherein the statistics of the I channel symbol comprise a mean value and a variance value; and
   wherein the a priori information corresponds to one of information about an LLR and information about an extrinsic LLR with respect to the previously estimated symbol; and
   performing a one-dimensional (1D) soft demapping on the pre-processed symbol.

2. The method of claim 1, wherein the pre-processing and the soft demapping are performed continuously.

3. The method of claim 1, wherein the symbol corresponds to a rotated quadrature amplitude modulation (QAM) symbol.

4. The method of claim 1, wherein the pre-processing further comprises:
   dividing the symbol into an I channel symbol and a Q channel symbol, based on the a priori information.

5. The method of claim 4, wherein the dividing of the symbol into the I channel symbol and the Q channel symbol comprises:
   estimating the I channel symbol of the symbol and the Q channel symbol of the symbol, based on a minimum mean square error (MMSE) method or a minimum mean square error-interference cancellation (MMSE-IC) method.

6. The method of claim 4, wherein the soft demapping comprises:
   calculating a 1D log-likelihood ratio (LLR) with respect to the I channel symbol of the symbol, and a 1D LLR with respect to the Q channel symbol of the symbol.

7. The method of claim 6, wherein the calculating of the 1D LLR with respect to the I channel symbol of the symbol, and the calculating of the 1D LLR with respect to the Q channel symbol of the symbol, comprises:
   calculating the 1D LLR with respect to the I channel symbol of the symbol, and the 1D LLR with respect to the Q channel symbol of the symbol, based on the a priori information.

8. The method of claim 5, further comprising:
   remodulating the symbol by extracting a mean value and a variance value, of the I channel symbol of the symbol and the Q channel symbol of the symbol.

9. The method of claim 8, wherein the pre-processing further comprises:
   estimating an I channel symbol of a subsequently received symbol, based on the mean value and the variance value of the Q channel symbol of the symbol, and
   estimating a Q channel symbol of the subsequently received symbol, based on the mean value and the variance value of the I channel symbol of the symbol.

10. An apparatus to perform a soft demapping, the apparatus comprising:
    a pre-processing unit configured to pre-process a symbol, based on a priori information, wherein the preprocessing comprises
    pre-processing an I channel symbol of the symbol, based on statistics of a Q channel symbol of a previously estimated symbol, and pre-processing a Q channel symbol of the symbol, based on statistics of an I channel symbol of the previously estimated symbol;
wherein the statistics of the Q channel symbol comprise a mean value and a variance value; and
wherein the statistics of the I channel symbol comprise a mean value and a variance value; and
wherein the a priori information corresponds to one of information about an LLR and information about an extrinsic LLR with respect to the previously estimated symbol; and
a demapping unit configured to perform a one-dimensional (1D) soft demapping on the pre-processed symbol.

11. The apparatus of claim 10, wherein the pre-processing unit and the demapping unit are configured to be operated continuously.

12. The apparatus of claim 10, wherein the symbol corresponds to a rotated quadrature amplitude modulation (QAM) symbol.

13. The apparatus of claim 10, wherein the pre-processing unit comprises:
a channel divider configured to divide the symbol into an I channel symbol and a Q channel symbol, based on the a priori information.

14. The apparatus of claim 13, wherein the channel divider is configured to estimate the I channel symbol of the symbol and the Q channel symbol of the symbol, based on a minimum mean square error (MMSE) method or a minimum mean square error-interference cancellation (MMSE-IC) method.

15. The apparatus of claim 13, wherein the demapping unit comprises:
a 1D log-likelihood ratio (LLR) calculation unit configured to calculate a 1D LLR with respect to the I channel symbol of the symbol and calculate a 1D LLR with respect to the Q channel symbol of the symbol.

16. The apparatus of claim 15, wherein the LLR calculation unit is configured to calculate the 1D LLR with respect to the I channel symbol of the symbol, and the 1D LLR with respect to the Q channel symbol of the symbol, based on the a priori information.

17. The apparatus of claim 14, further comprising:
a soft remodulation unit configured to remodulate the symbol,
wherein the soft remodulation unit comprises a symbol information extraction unit configured to extract a mean value and a variance value, of the I channel symbol of the symbol and the Q channel symbol of the symbol.

18. The apparatus of claim 17, wherein the pre-processing unit comprises:
an I channel symbol estimation unit configured to estimate an I channel symbol of a subsequently received symbol, based on the mean value and the variance value of the Q channel symbol of the symbol, and
a Q channel symbol estimation unit configured to estimate a Q channel symbol of the subsequently received symbol, based on the mean value and the variance value of the I channel symbol of the symbol.

19. A receiver, comprising:
a pre-processing unit configured to divide a symbol, based on information about a log-likelihood ratio (LLR) or information about an extrinsic LLR with respect to a previously estimated symbol, wherein the preprocessing comprises
pre-processing an I channel symbol of the symbol, based on statistics of a Q channel symbol of a previously estimated symbol, and
pre-processing a Q channel symbol of the symbol, based on statistics of an I channel symbol of the previously estimated symbol; and
wherein the statistics of the Q channel symbol comprise a mean value and a variance value; and
wherein the statistics of the I channel symbol comprise a mean value and a variance value; and
a demapping unit configured to calculate a 1D log-likelihood ratio (LLR) with respect to the I channel symbol and a 1D LLR with respect to the Q channel symbol.

20. The apparatus of claim 19, wherein the demapping unit is further configured to calculate the 1D LLR with respect to the I channel symbol of the symbol, and the 1D LLR with respect to the Q channel symbol of the symbol.

21. The apparatus of claim 19, further comprising:
a bit de-interleaver configured to interleave the 1D LLR with respect to the I channel symbol of the symbol, and the 1D LLR with respect to the Q channel symbol of the symbol calculated in the demapping unit.

22. The apparatus of claim 19, wherein the pre-processing unit comprises:
an I channel symbol estimation unit configured to estimate an I channel symbol of a subsequently received symbol, based on a mean value and a variance value of the Q channel symbol of the symbol, and
a Q channel symbol estimation unit configured to estimate a Q channel symbol of the subsequently received symbol, based on a mean value and a variance value of the I channel symbol of the symbol.

* * * * *